United States Patent [19]
Soirinsuo et al.

[11] Patent Number: 6,028,861
[45] Date of Patent: Feb. 22, 2000

[54] METHOD AND APPARATUS FOR PERFORMING PACKET SYNCHRONIZED SWITCH-OVER

[75] Inventors: Timo Soirinsuo; Pasi Vaananen, both of Cambridge, Mass.

[73] Assignee: Nokia Telecommunications, Oy, Espoo, Finland

[21] Appl. No.: 08/827,267

[22] Filed: Mar. 27, 1997

[51] Int. Cl.[7] .............................. H04L 12/28; H04L 12/56
[52] U.S. Cl. ......................... 370/395; 370/397; 370/399
[58] Field of Search ..................................... 370/389, 395, 370/397, 399, 398, 392, 410, 396, 503, 509, 393, 428, 218, 249, 220, 462, 411, 412, 413, 414, 415, 416, 417, 418, 419, 360, 381, 382, 383, 384, 253, 426, 474, 252, 230, 231

[56] References Cited

U.S. PATENT DOCUMENTS

| | | | |
|---|---|---|---|
| 5,420,858 | 5/1995 | Marshall et al. | 370/474 |
| 5,784,695 | 7/1998 | Upton et al. | 455/442 |
| 5,850,395 | 12/1998 | Hauser et al. | 370/389 |

*Primary Examiner*—Chi H. Pham
*Assistant Examiner*—Steven Nguyen
*Attorney, Agent, or Firm*—Altera Law Group, LLC

[57] ABSTRACT

A method and apparatus for performing packet synchronized switch-over is disclosed. The present invention eliminates packet loss by preventing frame integrity from being broken. Switch-over requests soliciting a change from a first virtual channel link to a second virtual channel link are received. After the receipt of a switch-over request, state information for identifying the occurrence of a frame completed state is monitored. The switch-over from the first virtual channel link to the second virtual channel link is performed when the frame completed state occurs. The frame completed state is detected by determining whether a current cell being received has an AUU set. The invention eliminates packet loss by maintaining layer frame integrity for both ingress and egress switch-over requests.

33 Claims, 10 Drawing Sheets

METHOD AND APPARATUS FOR PERFORMING PACKET SYNCHRONIZED SWITCH-OVER

BACKGROUND OF THE INVENTION

1. Field of the Invention

This invention relates in general to cell relay devices, and more particularly to a method and apparatus for performing switch-over in an intermediate cell switching entity that eliminates packet loss by preventing frame integrity from being broken during the switch-over.

2. Description of Related Art

Cell relay refers to any data communications technology that is based on transmission of small, fixed-length data units called cells. Cells are made up of a header field, containing address information, and an information field, carrying user data. With cell relay, a cell converter takes the constant-bit-rate streams of voice and video devices and the variable-bit-rate streams of data devices and converts them into cells. These cells are then routed across a cell relay network to multiple destinations, based on the address information in the headers. At each destination, other cell converters recreate the bit streams and deliver them to the user devices. With cell relay, separate applications can be consolidated onto a single, higher speed network, improving overall price/performance. Furthermore, because a cell relay network is based on switching fixed-length data units, it is possible to build high performance switching fabrics supporting burst rates of hundreds of megabits per second.

Asynchronous Transfer Mode (ATM) is just one example of a cell-based switching and multiplexing technology. ATM is designed to be a general-purpose, connection-oriented transfer mode for a wide range of services. Today, ATM is being used on local area networks (LANs), metropolitan area networks (MANs) and wide area networks (WANs). As a result, ATM is rapidly becoming the premier protocol for many communication and networking applications. With ATM installed on LANs, MANs and WANs, all types of voice, data and video traffic can operate together seamlessly. No other protocol offers this seamless integration of information, making ATM a catalyst for technological advances in telecommunications, multimedia and other markets.

ATM handles both connection-oriented traffic and connectionless traffic through the use of adaptation layers. Typically, ATM virtual connections operate at either a Constant Bit Rate (CBR) or a Variable Bit Rate (VBR). Each ATM cell sent into the network contains addressing information that establishes a virtual connection from origination to destination. All cells are then transferred, in sequence, over this virtual connection. ATM provides either Permanent or Switched Virtual Circuits (PVCs or SVCs). ATM is asynchronous because the transmitted cells need not be periodic as time slots of data as in Synchronous Transfer Mode (STM).

ATM offers the potential to standardize on one network architecture, which defines the multiplexing and switching method. ATM also supports multiple Quality of Service (QoS) classes for differing application requirements on delay and loss performance. Thus, the vision of ATM is that an entire network can be constructed using ATM and ATM Application Layer (AAL) switching and multiplexing principles to support a wide range of all services, such as:

Voice

Packet data (Switched MultiMegabit Data Service (SMDS), Internet Protocol (IP), Frame Relay (FR)

Video

Imaging

Circuit emulation

ATM also provides bandwidth-on-demand through the use of SVCs, and also supports LAN-like access to available bandwidth.

ATM standards define a fixed-size cell with a length of 53 octets (or bytes) comprised of a 5-octet header and a 48-octet payload. With a relatively small cell size, ATM is a compromise between the long frames generated in data communications and the short, repetitive transmissions required for voice communications, video transmission and other isochronous data transmission.

The bits in the cells are transmitted over the transmission path in a continuous stream. Cells are mapped into a physical transmission path, such as the North American Digital Signal Level 1 (DS1), DS3, or SONET; International Telecommunications Union-Telecommunications standardization sector (ITU-T) SDH standards; and various other local fiber and electrical transmission payloads.

All information is switched and multiplexed in an ATM network using these fixed-length cells. The cell header identifies the destination, cell type, and priority. Fields of the cell header include: the Virtual Path Identifier (VPI) and Virtual Circuit Identifier (VCI) which hold local significance only, and identify the destination. The Generic Flow Control (GFC) field allows a multiplexer to control the rate of an ATM terminal. The Payload Type (PT) indicates whether the cell contains user data, signaling data, or maintenance information. The Cell Loss Priority (CLP) bit indicates the relative priority of the cell. Lower priority cells may be discarded before priority cells during congested intervals.

Because of its critical nature, the cell includes a Header Error Check (HEC) which detects and corrects errors in the header. The payload field is passed through the network intact, with no error checking or correction. ATM relies on higher layer protocols to perform error checking and correction on the payload. The fixed cell size simplifies the implementation of ATM switches and multiplexers while providing very high speeds.

When using ATM, longer packets cannot delay shorter packets as in other switched implementations because long packets are chopped up into many cells. This enables ATM to carry Constant Bit Rate (CBR) traffic such as voice and video in conjunction with Variable Bit-Rate (VBR) data traffic, potentially having very long packets within the same network.

Three major concepts in ATM are: the transmission path, the Virtual Path (VP), and, optionally, the Virtual Circuit (VC). These form the basic building blocks of ATM. A physical transmission path contains one or more virtual paths (VPs), while each virtual path contains one or more virtual circuits (VCs). Thus, multiple virtual circuits can be trunked on a single virtual path. Switching can be performed on either a transmission path, virtual path, or virtual circuit (i.e., channel) level.

This capability to switch down to a virtual circuit level is similar to the operation of a Private or Public Branch Exchange (PBX) or telephone switch in the telephone world. In the PBX/switch, each channel within a trunk group (path) can be switched. Devices which perform VC connections are commonly called VC switches because of this analogy with telephone switches. Transmission networks use a cross-connect, which is basically a space division switch, or effectively an electronic patch panel. ATM devices which connect VPs are commonly called VP cross-connects by analogy with the transmission network.

At the ATM layer, users are provided a choice of either a Virtual Path Connection (VPC) or a Virtual Channel Connection (VCC). VPCs are switched based upon the Virtual Path Identifier (VPI) value only. The users of the VPC may assign the VCCs within that VPI transparently since they follow the same route. VCCs are switched upon the combined VPI and Virtual Circuit Identifier (VCI) value.

Both VPIs and VCIs are used to route cells through the network. It should be noted that VPI and VCI values must be unique on a specific transmission path (TP). Thus, each transmission path between two network devices (such as ATM switches) uses VPIs and VCIs independently.

Accordingly, ATM networks will be used quite extensively for data transfer. However, a data network can be built on top of an ATM network so that ATM is used as a technology to interconnect those sites to form an overlay network. Those skilled in the art will recognize that a data network scenario is mentioned herein as an example only. Thus, the present invention is not meant to be limited to data networks.

As suggested above, some data networks are connectionless in nature and run dynamic routing protocols to determine the path through the network. The path that each data flow takes is subject to change for several reasons including the cases where the previous path is not available any more or it has for some reason become non-optimal. The changes in the data network routing will reflect into the underlying ATM network and may generate a need for reconfiguring of connections.

For an ATM switch, a connection modification may refer to the modification of bandwidth resources associated with the connection. However, in this case, the endpoint may remain the same. Nevertheless, a connection modification may also refer to a situation where one of ATM virtual channel link (VCL) termination points, either incoming or outgoing, will be changed in the switch. In this latter case, resources may be the same for both the old and the new connection. In a special case of a connection that is terminated in the switch, the connection topology change is internal to the switch and results in changing the point that handles AAL frames, i.e. AAL connection termination point. Hereinafter, the term switch-over is used to indicate connection modifications where one of the ATM virtual channel link termination points is changed in a switch. Resource allocation will be assumed to be unchanged.

ATM is a scaleable standard that does not specify requirements for transmission rates, framing and physical layers. Rather, ATM switching and ATM networks refer only to the handling of cells. ATM does not dictate the content of information carried in cells. Broadband networks must develop guarantees on bandwidth, delay and jitter to support a wide variety of ATM applications.

As mentioned earlier, ATM cells have a fixed length payload field that is 48 octets. However, data packets that are carried in ATM cells are normally longer than 48 octets and are not integral multiple of 48 octets. Therefore, the ATM Adaptation Layer (AAL) is used to assemble and reassemble those packets into/from cells.

However, if for one reason or the other, some cells are lost or misrouted in the network, the whole frame associated with the lost cell will be worthless. In order to eliminate packet loss resulting from connection changes, the switch-over has to be performed so that frame integrity is not broken. This problem is encountered with all types of cell relay systems.

It can be seen then that there is a need to add additional intelligence to an intermediate switch to prevent packet loss at the switch-over.

It can also be seen that there is a need for a method and apparatus for performing cell switch-over that eliminates packet loss by preventing frame integrity from being broken during the switch-over.

SUMMARY OF THE INVENTION

To overcome the limitations in the prior art described above, and to overcome other limitations that will become apparent upon reading and understanding the present specification, the present invention discloses a method and apparatus for performing packet synchronized switch-over in ATM.

The present invention solves the above-described problems by preventing frame integrity from being broken.

A system in accordance with the principles of the present invention receives a switch-over request soliciting a change from a first virtual channel link to a second virtual channel link, monitors the state information to identify the occurrence of a frame completed state and performs the switch-over from the first virtual channel link to the second virtual channel link when the frame completed state is detected.

Other embodiments of a system in accordance with the principles of the invention may include alternative or optional additional aspects. One such aspect of the present invention is that the state information is a middle of frame state until the frame completed state occurs.

Another aspect of the present invention is that identifying a frame completed state includes detecting whether a current cell being received has an end of frame indication.

Another aspect of the present invention is that the switch-over request includes an ingress switch-over request for changing the first and second virtual channel links at an egress side of the switch.

Another aspect of the present invention is that determining a frame completed state includes processing the forwarding of the frame through the first virtual channel link until the frame completed state is detected.

Another aspect of the present invention is that the switch-over request includes an egress switch-over request for changing the first and second virtual channel links at an ingress side of the switch.

Yet another aspect of the present invention is that cells are received on the first and second virtual channel links at the ingress side of the switch.

Another aspect of the present invention is that all cells coming from the second virtual channel link are discarded until a frame complete state is detected on the first virtual channel link.

Another aspect of the present invention is that all cells on the first virtual channel link are discarded after the frame completed state is detected on the first virtual channel link.

Another aspect of the present invention is that the cells being received on the first and second virtual channel links comprise separate connection identification.

Still another aspect of the present invention is that the connection identification includes a virtual path identifier, and a virtual channel identifier.

Another aspect of the present invention is that the connection identification further includes a routing tag.

Another aspect of the present invention is that the monitoring is performed at the ingress side of the switch.

Another aspect of the present invention is that the state information of the second virtual channel link is established.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for performing switch-over in an intermediate entity that eliminates packet loss by preventing frame integrity from being broken. The present invention receives switch-over requests soliciting a change from a first virtual channel link to a second virtual channel link. After the receipt of a switch-over request, state information for identifying the occurrence of a frame completed state is monitored. The switch-over from the first virtual channel link to the second virtual channel link is performed when the frame completed state occurs. In one particular embodiment, the frame completed state is detected by determining whether a current cell being received has an AUU set. The invention eliminates packet loss by maintaining layer frame integrity for both ingress and egress switch-over requests.

Figure 1:
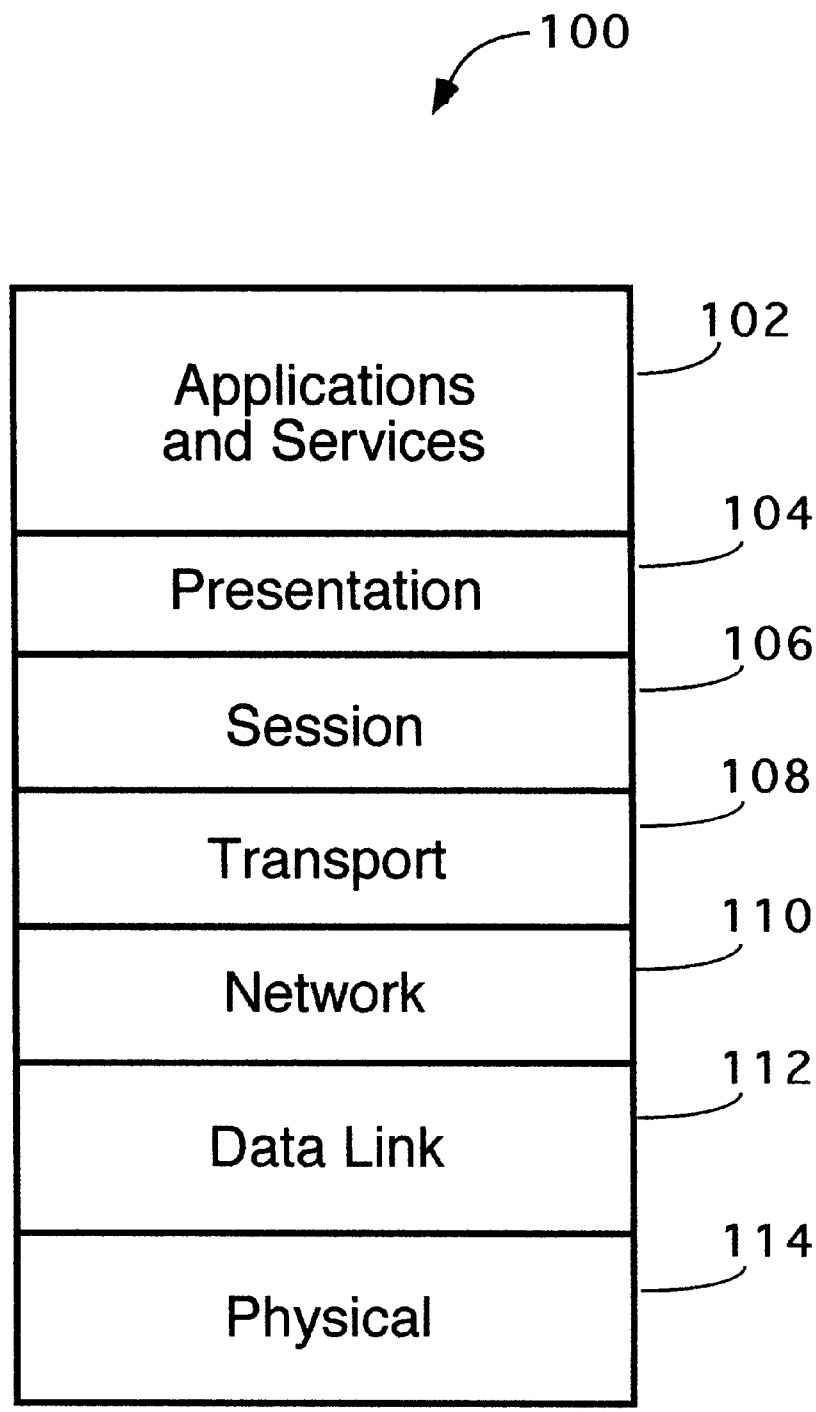
FIG. 1 illustrates the seven layer Open Systems Interconnection (OSI) model.

As will be appreciated by those skilled in the art, communication networks (e.g., ATM) and their operations can be described according to the Open Systems Interconnection (OSI) model 100 which includes seven layers including an application 102, presentation 104, session 106, transport 108, network 110, link 112, and physical 114 layer as illustrated in FIG. 1. The OSI model 100 was developed by the International Organization for Standardization (ISO) and is described in "The Basics Book of OSI and Network Management" by Motorola Codex from Addison-Wesley Publishing Company, Inc., 1993 (First Printing September 1992).

Each layer of the OSI model 100 performs a specific data communications task, a service to and for the layer that precedes it (e.g., the network layer provides a service for the transport layer). The process can be likened to placing a letter in a series of envelopes before it's sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In a data communication transaction, however, each end user is unaware of the envelopes, which perform their functions transparently. Each time that user application data passes downward from one layer to the next layer in the same system, more processing information is added. When that information is removed and processed by the peer layer in the other system, it causes various tasks (error correction, flow control, etc.) to be performed.

The ISO has specifically defined all seven layers, which are summarized below in the order in which the data actually flow as they leave the source:

Layer 7, the application layer 102, provides for a user application (such as getting money from an automatic bank teller machine) to interface with the OSI application layer 102. That OSI application layer 102 has a corresponding peer layer in the other open system, the bank's host computer.

Layer 6, the presentation layer 104, makes sure the user information (a request for $50 in cash to be debited from your checking account) is in a format (i.e., syntax or sequence of ones and zeros) the destination open system can understand.

Layer 5, the session layer 106, provides synchronization control of data between the open systems (i.e., makes sure the bit configurations that pass through layer 5 106 at the source are the same as those that pass through layer 5 106 at the destination).

Layer 4, the transport layer 108, ensures that an end-to-end connection has been established between the two open systems and is reliable (i.e., layer 4 108 at the destination confirms the request for a connection, so to speak, that it has received from layer 4 108 at the source).

Layer 3, the network layer 110, provides routing and relaying of data through the network (among other things, at layer 3 110 on the outbound side an address gets slapped on the envelope which is then read by layer 3 110 at the destination).

Layer 2, the data link layer 112, includes flow control of data as messages pass down through this layer in one open system and up through the peer layer in the other open system.

Layer 1, the physical interface layer 114, includes the ways in which data communications equipment is connected mechanically and electrically, and the means by which the data move across those physical connections from layer 1 114 at the source to layer 1 114 at the destination.

Figure 2:
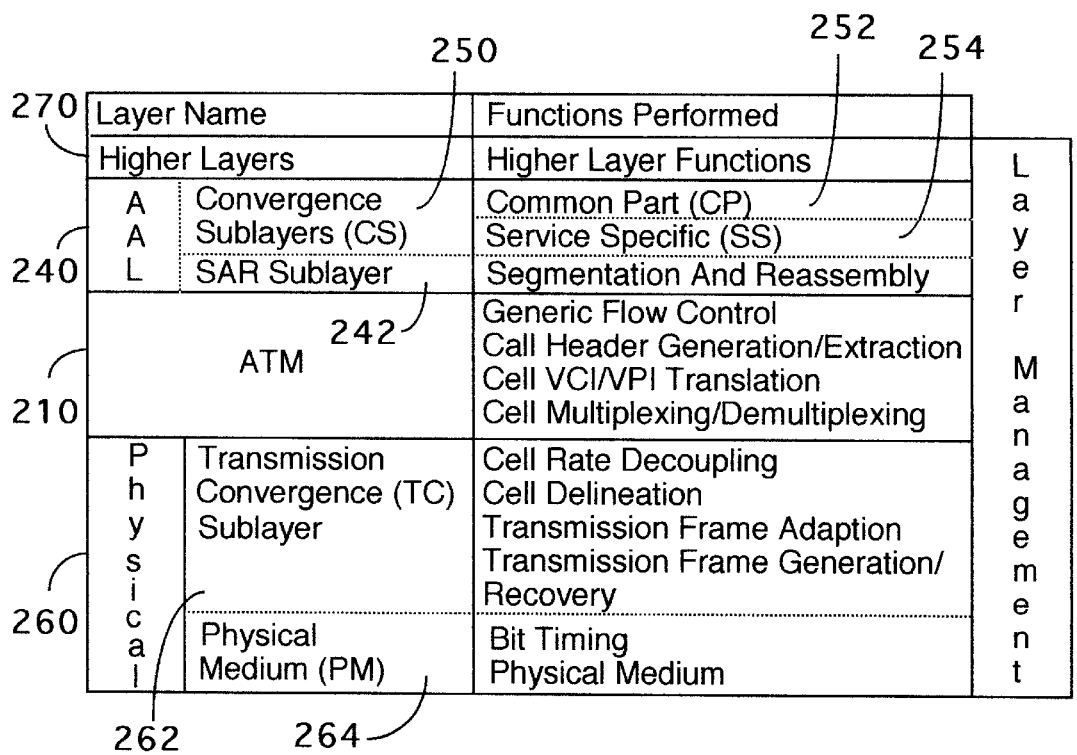
FIG. 2 illustrates four Broadband-Integrated Services Digital Network/Asynchronous Transfer Mode (B-ISDN/ATM) layers along with the sublayer structure of the ATM Adaptation Layer (AAL) and Physical (PHY) layer.

This same layering principals have been applied to cell relay communication networks of which ATM is one example. FIG. 2 shows four Broadband-Integrated Services Digital Network/Asynchronous Transfer Mode (B-ISDN/ATM)layers 210 along with the sublayer structure of the ATM Adaptation Layer (AAL) 240 and Physical (PHY) layer 260. Starting from the bottom, the Physical layer 260 has two sublayers: Transmission Convergence (TC) 262 and Physical Medium (PM) 264. The PM sublayer 264 interfaces with the actual physical medium and passes the recovered bit stream to the TC sublayer. The TC sublayer 262 extracts and inserts ATM cells within the Plesiochronous or Synchronous (PDH or SDH) Time Division Multiplexed (TDM) frame and passes these to and from the ATM layer, respectively.

The ATM layer 210 performs multiplexing, switching, and control actions based upon information in the ATM cell header and passes cells to, and accepts cells from, the ATM Adaptation Layer (AAL) 240. The AAL 240 has two sublayers: the Segmentation And Reassembly (SAR) sublayer 242 and the Convergence Sublayer (CS) 250. The CS 250 is further broken down into Common Part (CP) 252 and Service-Specific (SS) 254 components. The AAL 240 passes Protocol Data Units (PDUs) to and accepts PDUs from higher layers 270. PDUs may be of variable length, or may be of fixed length different from the ATM cells length.

The Physical layer 260 corresponds to layer 1 114 in the OSI model illustrated in FIG. 1. The ATM layer 210 and AAL 240 correspond to parts of OSI layer 2 112, but the address field of the ATM cell header has a network-wide connotation that is like OSI layer 3 110. The B-ISDN and ATM protocols and interfaces make extensive use of the OSI concepts of layering and sublayer.

Figure 3:
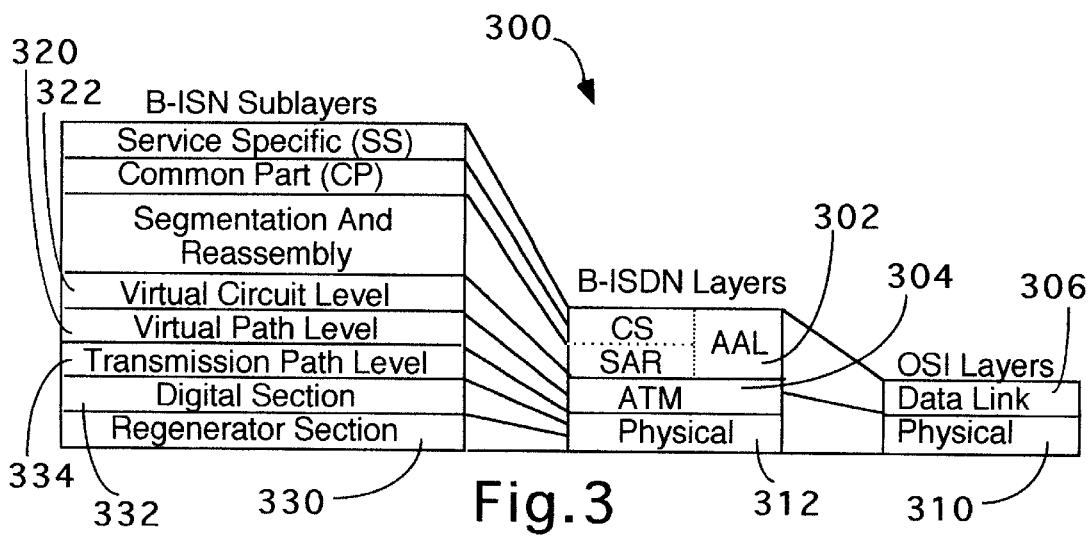
FIG. 3 illustrates the mapping of the B-ISDN layers to the OSI layers and the sublayers of the PHY, ATM, and ATM Adaptation layers.

FIG. 3 illustrates the mapping 300 of the B-ISDN layers to the OSI layers and the sublayers of the PHY, ATM, and ATM Adaptation layers. FIG. 3 illustrates that the AAL layer 302 and ATM layer 304 do not match exactly with the data link layer 306 of the OSI model. Furthermore, FIG. 3 illustrates that the functions of the physical layer 310 of the OSI model do not map precisely to the physical layer 312 of the B-ISDN model.

The following describes the Asynchronous Transfer Mode (ATM) layer 304. To construct and interpret ATM Virtual Paths (VPs) and Virtual Circuits (VCs), the ATM layer includes a virtual path sublayer 320 and virtual circuit layer 322. The physical layer 312 is composed of three levels: regenerator section 330, digital section 332, and transmission path 334. At the ATM layer 304, the transmission path is the main area of focus because this is essentially the TDM payload that connects ATM devices. Generically, an ATM device may be either an endpoint or a connecting point for a VP or VC. A Virtual Path Connection (VPC) or a Virtual circuit Connection (VCC) exists only between endpoints. A VP link or a VC link can exist between an endpoint and a connecting point or between connecting points. A VPC or VCC is an ordered list of VP or VC links, respectively, that define a unidirectional flow of ATM cells from one user to one or more other users.

Several key functions are performed by each sublayer of the ATM layer 304. The ATM layer 304 provides many functions, including:

Cell Construction

Cell Reception and Header Validation

Cell Relaying, Forwarding, and Copying Using the VPI/VCI

Cell Multiplexing and Demultiplexing Using the VPI/VCI

Cell Payload Type Discrimination

Interpretation of pre-defined Reserved Header Values

Cell Loss Priority Processing

Support for Multiple QoS Classes

Usage Parameter Control (UPC)

Explicit Forward Congestion Indication (EFCI)

Generic Flow Control

Connection Assignment and Removal

The attributes of the service class for AAL 302 are the timing relationships required between the source and destination, whether the bit rate is constant or variable, and whether the connection mode is connection-oriented or connectionless. The four AAL service classes are as follows:

Class A—constant bit-rate (CBR) service with end-to-end timing, connection-oriented Class B—variable bit-rate (VBR) service with end-to-end timing, connection-oriented Class C—variable bit-rate (VER) service with no timing required, connection-oriented Class D—variable bit-rate (VBR) service with no timing required, connectionless AAL-1 through AAL-4 were initially defined to directly map to the AAL service classes A through D. AAL-5 was conceived by the computer industry in response to perceived complexity and implementation difficulties in the AAL-3/4. While the AAL-3/4 provides a rich set of services, it does so at the expense of additional protocol overhead and processing. AAL-5, originally coined the Simple and Efficient Adaptation Layer (SEAL), was designed to provide similar services at lower overhead. AAL-5 takes advantage of the ATM End of Message (EOM) flag to signal the end of a single message. Significant overhead is eliminated by removing the SAR header and trailer.

Figure 4:
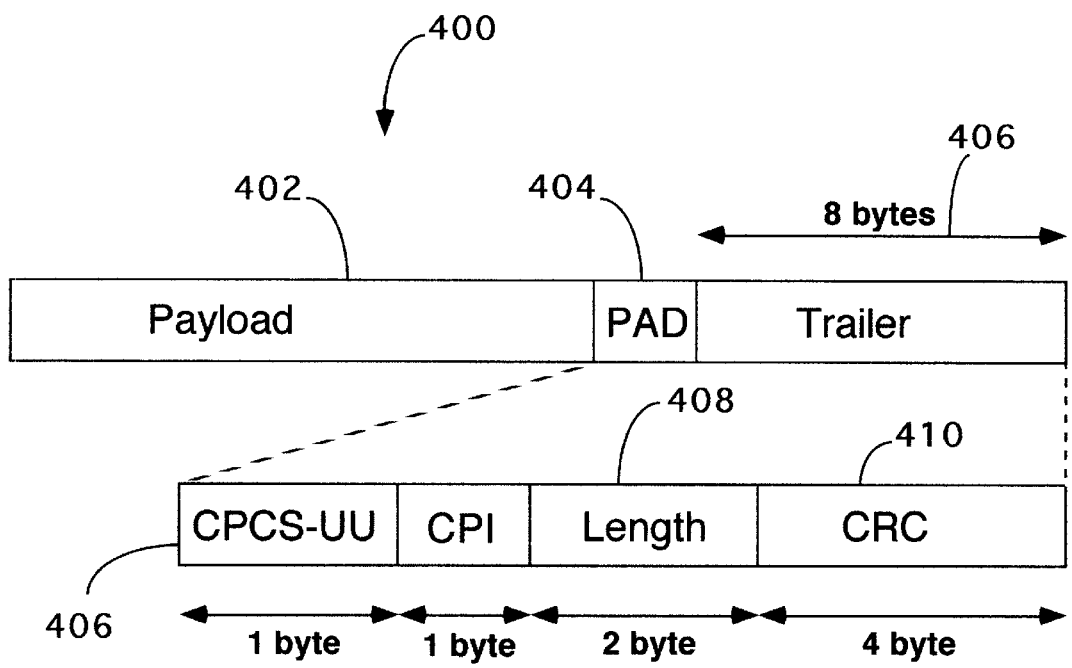
FIG. 4 illustrates the construction of a CPCS-PDU that is later segmented into a series of 48 octet ATM cells.

FIG. 4 illustrates the construction of an AAL-5 CPCS-PDU 400 that can carry a payload 402 of between 1 and 65535 octets. The CPCS-PDU 400 also includes a padding field 404 and an 8-byte trailer 406. The padding field 404 is of a variable length chosen such that the entire CPCS-PDU 400 is an exact multiple of 48 so that it can be directly segmented into cell payloads. The User-to-User (UU) information 406 is conveyed between AAL users transparently. The length field 408 identifies the length of the CPCS-PDU payload 402 so that the PAD 404 can be removed. Since 16 bits are allocated to the length field 408, the maximum payload length is $2^{16}-1=65,535$ octets. The CRC 410 detects errors in the CPCS-PDU 400.

Figure 5:
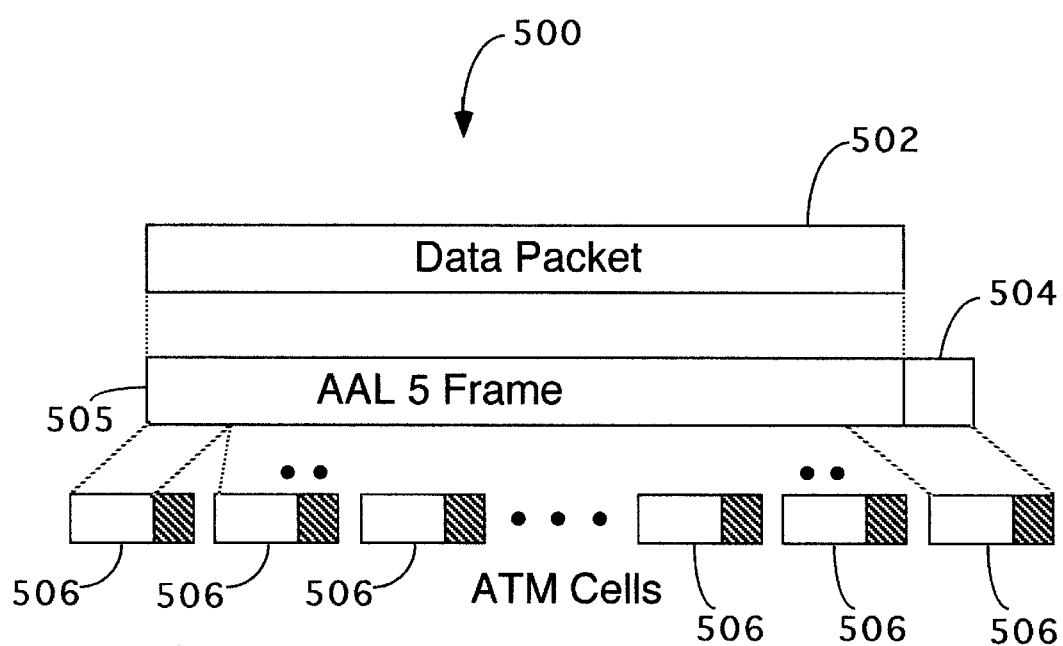
FIG. 5 illustrates an AAL-5 frame being broken down into ATM cells.

FIG. 5 illustrates an AAL-5 frame being broken down into ATM cells 500. Initially, a data packet 502 is received at the ATM Adaptation Layer where a header 504 is attached to the data packet to form the AAL-5 PDU 505. The AAL-5 PDU 505 is then segmented into 48 octet ATM cells 506.

Figure 6:
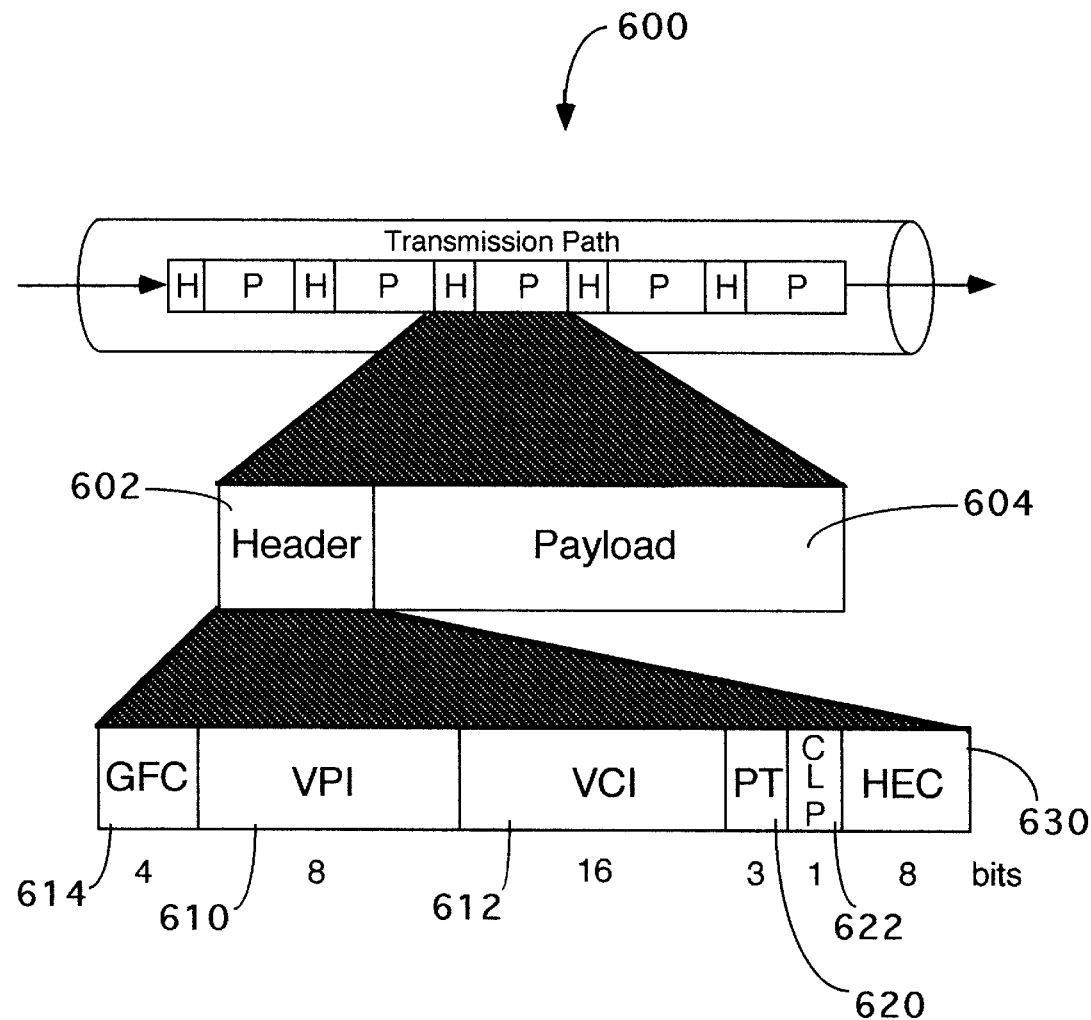
FIG. 6 illustrates the format for an ATM cell.

FIG. 6 illustrates the format 600 for an ATM cell. The ATM standards define a fixed-size cell with a length of 53 octets comprised of a 5 octet header 602 and a 48 octet payload 604. The bits for a packet are transmitted over the transmission path in a continuous stream. All information is switched and multiplexed in an ATM network in these fixed-length cells. The cell header 602 identifies the destination, cell type and priority. The Virtual Path Identifier (VPI) 610 and Virtual Circuit Identifier (VCI) 612 hold local significance only, and identify the destination. The Generic Flow Control (GFC) field 614 allows a multiplexer to control the rate of an ATM terminal. The Payload Type (PT) 620 indicates whether the cell contains user data, signaling data, or maintenance information. The Cell Loss Priority (CLP) 622 indicates the relative priority of the cell. Lower priority cells are discarded before higher priority cells during congested intervals. Finally, a Header Error Check (HEC) 630 is provided to detect and correct errors in the header.

The Virtual Circuit Identifier (VCI) 612 in the cell header identifies a single VC on a particular Virtual Path (VP). Switching at a VC connecting point is done based upon the combination of VP and VCI 612. A VC link is defined as a unidirectional flow of ATM cells with the same VCI 612 between a VC connecting point and either a VC endpoint or another VC connecting point. A VC endpoint also is called an ATM Service Access Point (SAP).

Virtual Paths (VPs) define an aggregate bundle of VCs between VP endpoints. A Virtual Path Identifier (VPI) 610 in the cell header identifies a bundle of one or more VCs. A VP link provides unidirectional transfer of cells with the same VPI 610 between VP endpoints or connecting points. Switching at a VP connecting point is done based upon the VPI 610. A VP link is defined as a VP between a VP connecting point and either a VP endpoint or another VP connecting point.

Typically, cell relay in general, and ATM in particular require the preservation of cell sequence integrity. This means that cells are delivered to intermediate connecting points and the destination endpoint in the same order in which they were transmitted. However, the path that each data flow takes is subject to change for several reasons, including the cases where the previous path is not available any more or where the path has become non-optimal.

The changes in the data network routing will reflect into the underlying network and may generate a need for reconfiguring of connections. Depending on the point where changes in the switch-over control is introduced, switch-over can be divided into ingress and egress switch-over, wherein changes internal to the switch is a special case of the former category.

Figure 7:
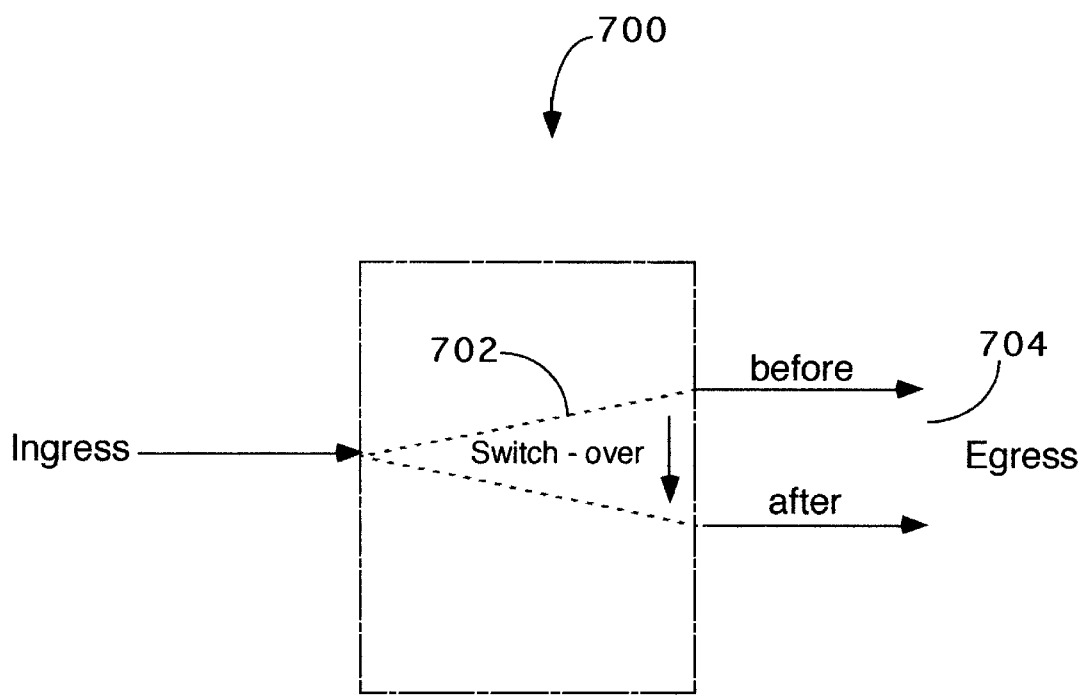
FIG. 7 illustrates an ingress switch-over.

FIG. 7 illustrates an ingress switch-over process 700. The ingress switch-over 702 occurs where the intermediate entity, such as an ATM switch, changes the egress VCL 704. This type of switch-over 700 is prominent where routing changes in the overlaying network.

Figure 8:
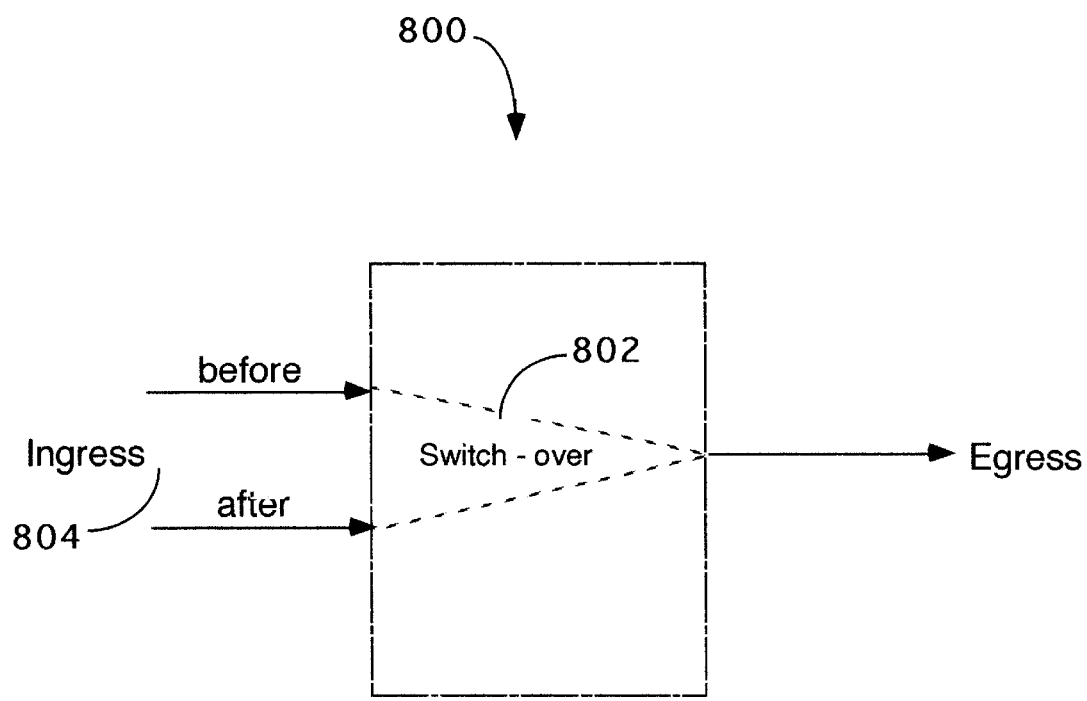
FIG. 8 illustrates an egress switch-over.

FIG. 8 illustrates an egress switch-over process 800. The egress switch-over 802 occurs where the intermediate entity changes the ingress VCL 804. An egress switch-over occurs, for example, when traffic is originated from wireless terminal and hand-off takes places.

Figure 9:
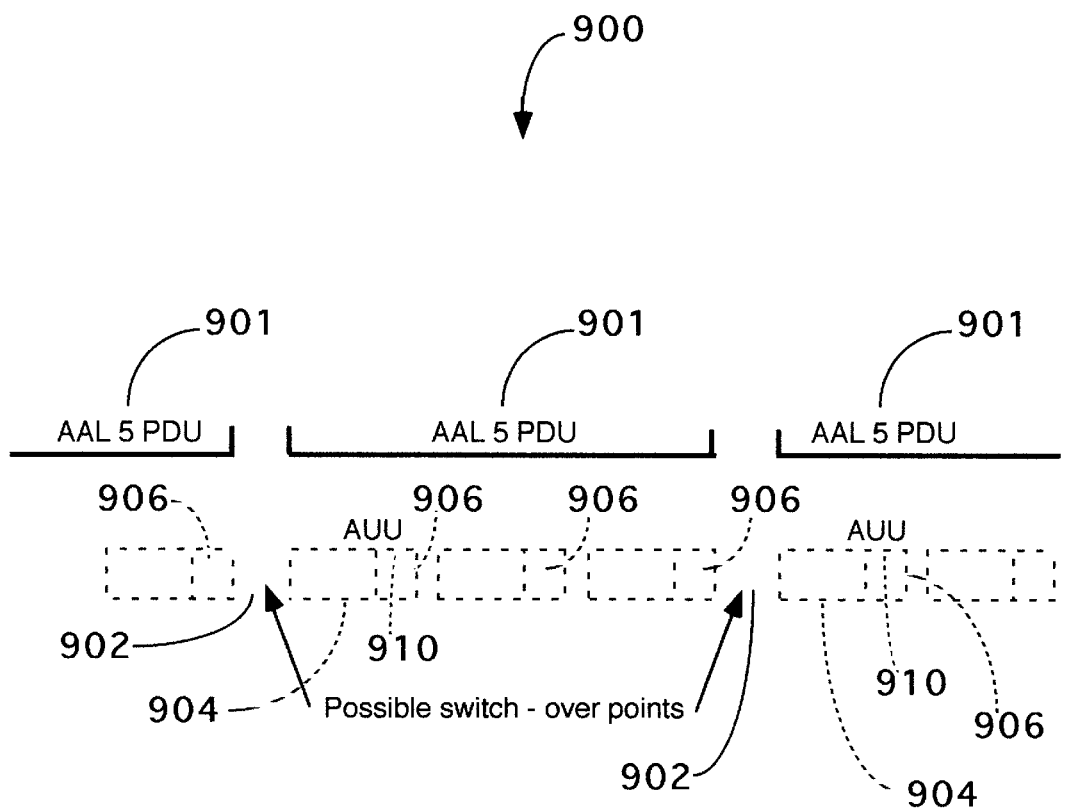
FIG. 9 illustrates the points of switch-over according to the present invention.

FIG. 9 illustrates the points of switch-over 900 for an ATM network according to the present invention. While ATM is used to describe the invention, those skilled in the art will recognize that the invention is likewise applicable to any cell relay protocol which provides an end of frame indication in the last cell of the frame.

FIG. 9 demonstrates that the integrity of AAL-5 packets 901 can be maintained by timing the switch-over so that switch-over 902 happens right after a cell 904 having a last cell indication set, e.g., the AUU or user signaling bit. The least significant bit of the Payload Type (PT) field provides the AUU indication. ATM entities only check the value of ATM header 906 and act on that value. As a consequence of this, a generic solution can be based on the AUU fields 910.

Data communications relies mostly on AAL-5, which uses the AUU field 910 of the ATM header 906 to indicate AAL-5 PDU boundaries, i.e. which cells belong to which packet within one VCC. If this AUU indication 910 is set in the ATM header, then the cell carrying this indication is the last cell of a frame 901.

Figure 10:
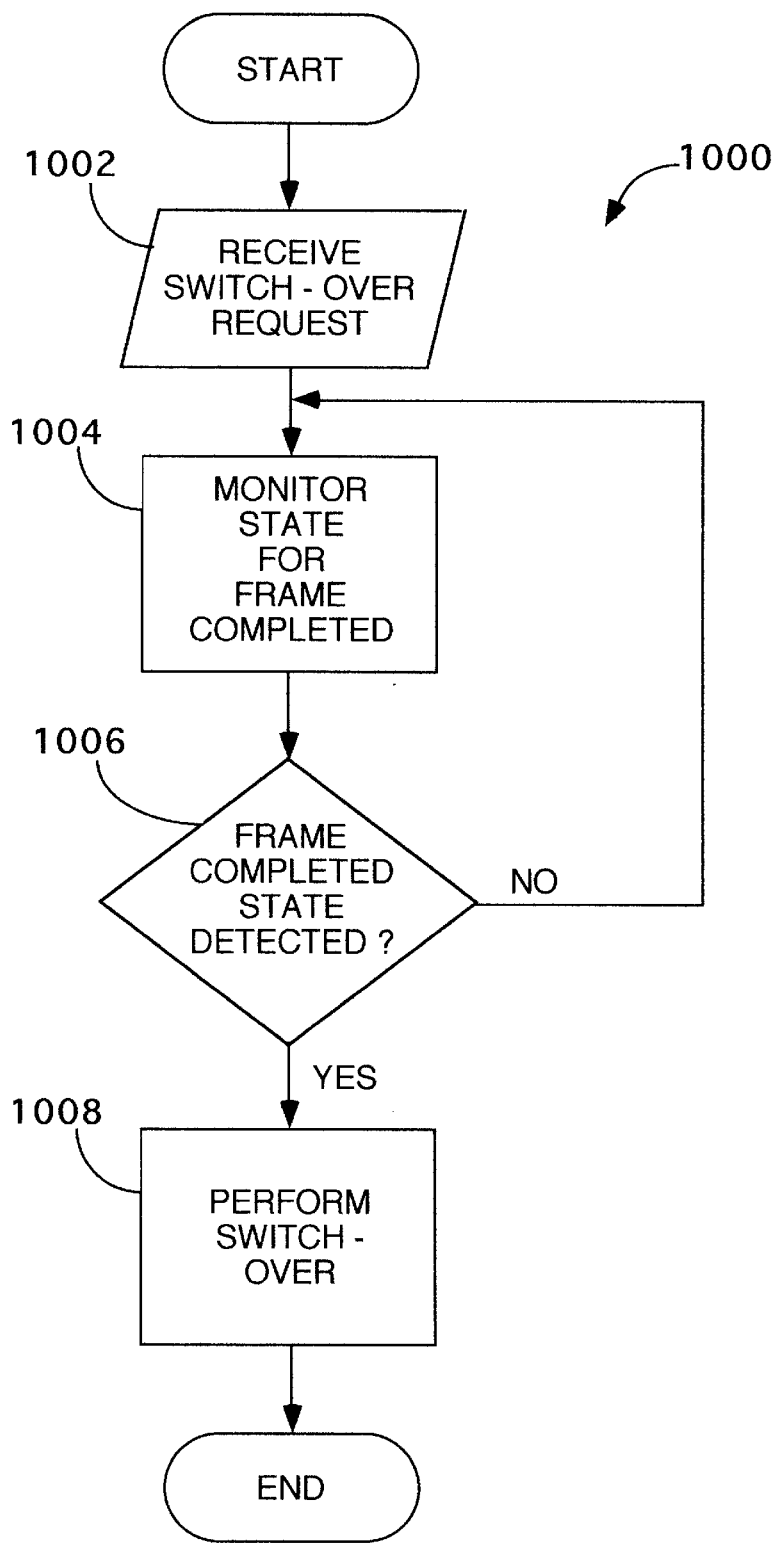
FIG. 10 illustrates a flow chart of the switch-over procedure according to the present invention.

FIG. 10 illustrates a flow chart 1000 of the switch-over procedure according to the present invention. A switch-over request is received 1002 soliciting a change from a first virtual channel link to a second virtual channel link. Then state information is monitored 1004 to identify the occurrence of a frame completed state.

For an ingress switch-over, the ingress side of the switch provides state information on each incoming VCL. The state of the VCL is either Middle Of the Frame (MOF) or Frame Completed (FC). For the Middle Of the Frame (MOF) state, the ingress side has either sent or is currently sending towards egress a cell which has no AUU indication set. For the Frame Completed (FC) state, the last cell sent or the cell that is currently being sent towards egress had an AUU set. The Frame Completed (FC) state is the default state.

For egress switch-over, the egress port will monitor the "new" channel after being notified about switch-over. Both incoming VCLs have a separate ATM layer identification, i.e., VPI/VCI and possibly a routing tag, at the outgoing side. The switch will discard all cells coming from that connection until it receives a cell with AUU set.

Once the frame completed state is detected 1006, switch-over from the first virtual channel link to the second virtual channel link is performed 1008.

For an ingress switch-over, if the Middle of Frame state occurs, the switch will process the switch-over request, but postpone carrying out the switch-over before entering into Frame Completed state. If the Frame Completed state is detected, the switch-over request is processed and carried out immediately. It is assumed that switch-over is cell synchronous by default.

For an egress switch-over, the ATM switch will send out all cells coming from the "new" connection and discard all cells received on the "old" channel.

Figure 11:
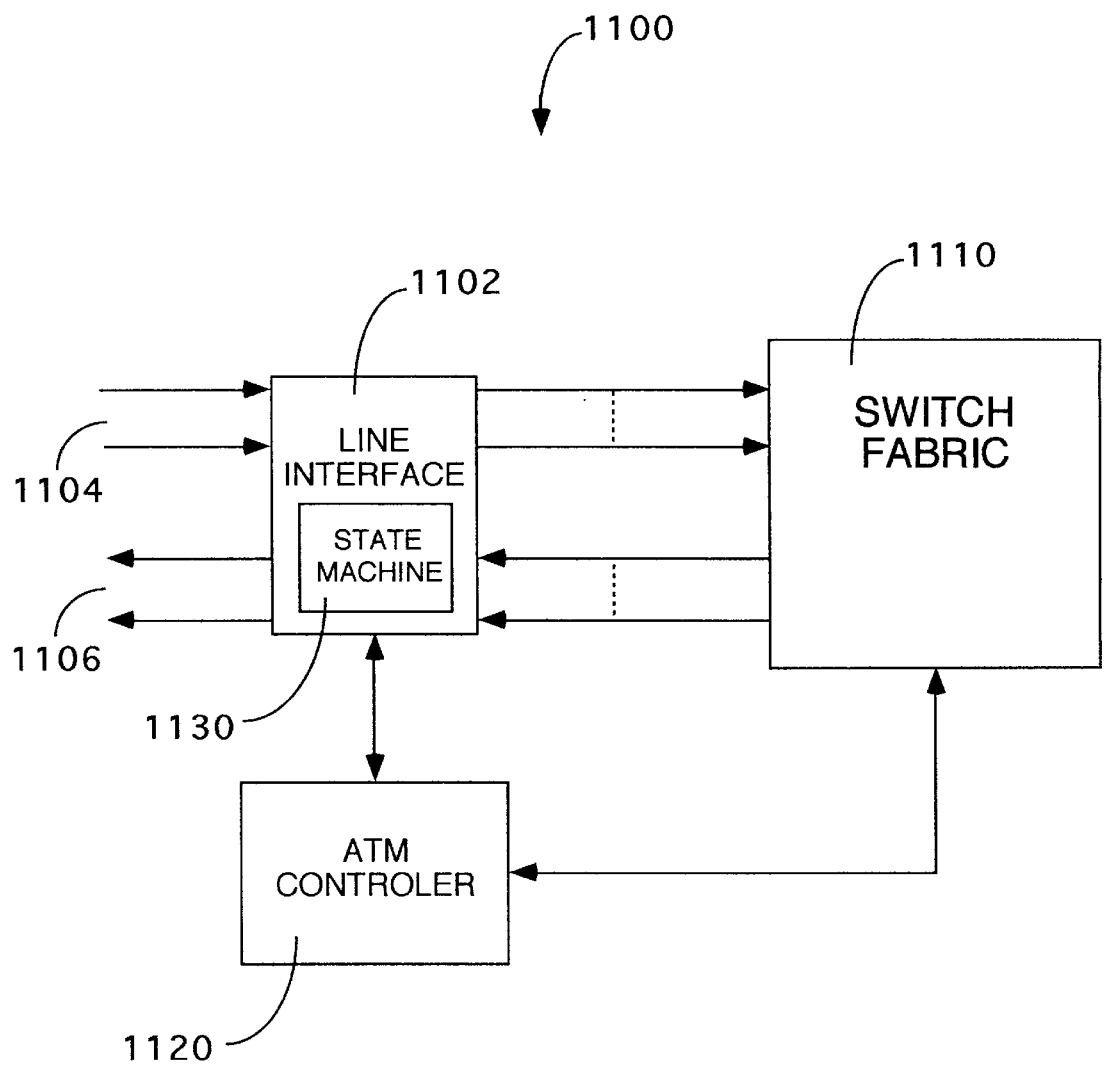
FIG. 11 illustrates a block diagram of an ATM switch according to the present invention.

FIG. 11 illustrates a block diagram 1100 for an ATM switch according to the present invention. The ATM switch includes a line interface device 1102 having a plurality of input and output ports connected to a plurality of input 1104 and output 1106 virtual channel links. A switch fabric 1110 is operatively coupled to the line interface device 1102 for routing incoming cells received from incoming virtual channel links 1104 to outgoing virtual channel links 1106. An ATM switch controller 1120 receives the switch-over request soliciting a change from a first virtual channel link to a second virtual channel link. The line interface 1102 includes a state machine 1130 for monitoring state information to identify the occurrence of a frame completed state. Those skilled in the art will recognize that the state information of the frame may be determine using methods other than a state machine. The controller 1120 initiates a switch-over from the first virtual channel link to the second virtual channel link when the controller 1120 requests that a second virtual channel link be established. The switch-over is carried out when the Frame Complete (FC) has been identified.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of performing packet synchronized switch-over for virtual channel links of an intermediate cell relay entity, comprising the steps of:

receiving a switch-over request, the switch-over request soliciting a change from a first virtual channel link to a second virtual channel link;

monitoring received cells for state information identifying the occurrence of a frame completed state of a frame; and performing switch-over from the first virtual channel link to the second virtual channel link after detecting state information in a cell identifying the occurrence of a frame completed state of a frame.

2. The method of claim 1 wherein the state information is a middle of frame state until the frame completed state occurs.

3. The method of claim 1 wherein the step of monitoring state information to identify the occurrence of a frame completed state comprises the step detecting whether a current cell being received has a last cell indicator set.

4. The method of claim 3 wherein the last cell indicator comprises an AUU bit.

5. The method of claim 1 wherein the switch-over request comprises an ingress switch-over request for changing the first and second virtual channel links at an egress side of the entity.

6. The method of claim 5 wherein the step of monitoring state information to identify the occurrence of a frame completed state further comprises the step of processing the forwarding of the frame through the first ivirtual channel link until the frame completed state is detected.

7. The method of claim 1 wherein the switch-over request comprises an egress switch-over request for changing the first and second virtual channel links at an ingress side of the entity.

8. The method of claim 7 further comprising the step of receiving cells on the first and second virtual channel links at the ingress side of the switch.

9. The method of claim 8 further comprising the step of discarding all cells coming from the second virtual channel link until a frame complete state is detected on the first virtual channel link.

10. The method of claim 8 further comprises the step of discarding all cells on the first virtual channel link after the frame completed state is detected on the first virtual channel link.

11. The method of claim 8 wherein the cells being received on the first and second virtual channel links comprise separate connection identification.

12. The method of claim 11 wherein the connection identification comprises an ATM layer identification.

13. The method of claim 11 wherein the ATM layer identification comprises a virtual path identifier, and a virtual channel identifier.

14. The method of claim 13 wherein the ATM layer identification further comprises a routing tag.

15. The method of claim 7 wherein the step of monitoring state information to identify the occurrence of a frame completed state further comprises the step of performing the monitoring at the ingress side of the entity.

16. The method of claim 15 wherein the step of performing the monitoring at the ingress side of the switch further comprises the step of establishing the state information of the second virtual channel link.

17. A cell relay switch for performing packet synchronized switch-over for virtual channel links, comprising:

a line interface device having a plurality of input and output ports connected to a plurality of virtual channel links;

a switch fabric, operatively coupled to the line interface device, for routing incoming cells received from incoming virtual channel links to outgoing virtual channel links; and a switch controller, operatively coupled to the line interface device, for receiving a switch-over request, the switch-over request soliciting a change from a first virtual channel link to a second virtual channel link;

wherein the line interface device monitors received cells for state information of incoming cells identifying the occurrence of a frame completed state of a frame and initiates switch-over from the first virtual channel link to the second virtual channel link after detecting state information in a cell identifying the occurrence of a frame completed state of a frame.

18. The cell relay switch of claim 17 wherein the state information is a middle of frame state until the frame completed state occurs.

19. The cell relay switch of claim 17 wherein the line interface device detects whether a current cell being received has a last cell indicator set.

20. The cell relay switch of claim 19 wherein the last cell indicator comprises an AUU bit.

21. The cell relay switch of claim 17 wherein the switch-over request comprises an ingress switch-over request for changing the first and second virtual channel links at an egress side of the cell relay switch.

22. The cell relay switch of claim 17 wherein the line interface device processes the forwarding of the frame through the first virtual channel link until the frame completed state is detected.

23. The cell relay switch of claim 17 wherein the switch-over request comprises an egress switch-over request for changing the first and second virtual channel links at an ingress side of the cell relay switch.

24. The cell relay switch of claim 22 wherein the line interface device receives cells on a first and second virtual channel link at the ingress side of the cell relay switch.

25. The cell relay switch of claim 24 wherein the line interface device discards all cells coming from the second virtual channel link until a frame complete state is detected on the first virtual channel link.

26. The cell relay switch of claim 24 wherein the line interface device discards all cells on the first virtual channel link after the frame completed state is detected on the first virtual channel link.

27. The cell relay switch of claim 24 wherein the cells being received on the first and second virtual channel links comprise separate connection identification.

28. The cell relay switch of claim 27 wherein the connection identification comprises an ATM layer indication.

29. The cell relay switch of claim 28 wherein the ATM layer identification comprises a virtual path identifier, and a virtual channel identifier.

30. The cell relay switch of claim 29 wherein the ATM layer identification further comprises a routing tag.

31. The cell relay switch of claim 17 wherein the line interface device monitors the ingress side of the cell relay switch.

32. The cell relay switch of claim 31 wherein the line interface device monitors state information for the second virtual channel link.

33. A cell relay intermediate entity providing packet synchronized switch-over for virtual channel links, comprising:

means for obtaining a switch-over request, the switch-over request soliciting a change from a first virtual channel link to a second virtual channel link;

means, operatively coupled to the obtaining means, for receiving cells and monitoring the received cells for state information identifying the occurrence of a frame completed state; and means, operatively coupled to the identifying means, for performing switch-over from the first virtual channel link to the second virtual channel link after detecting state information in a cell identifying the occurrence of a frame completed state of a frame.

* * * * *